Patented Sept. 26, 1922.

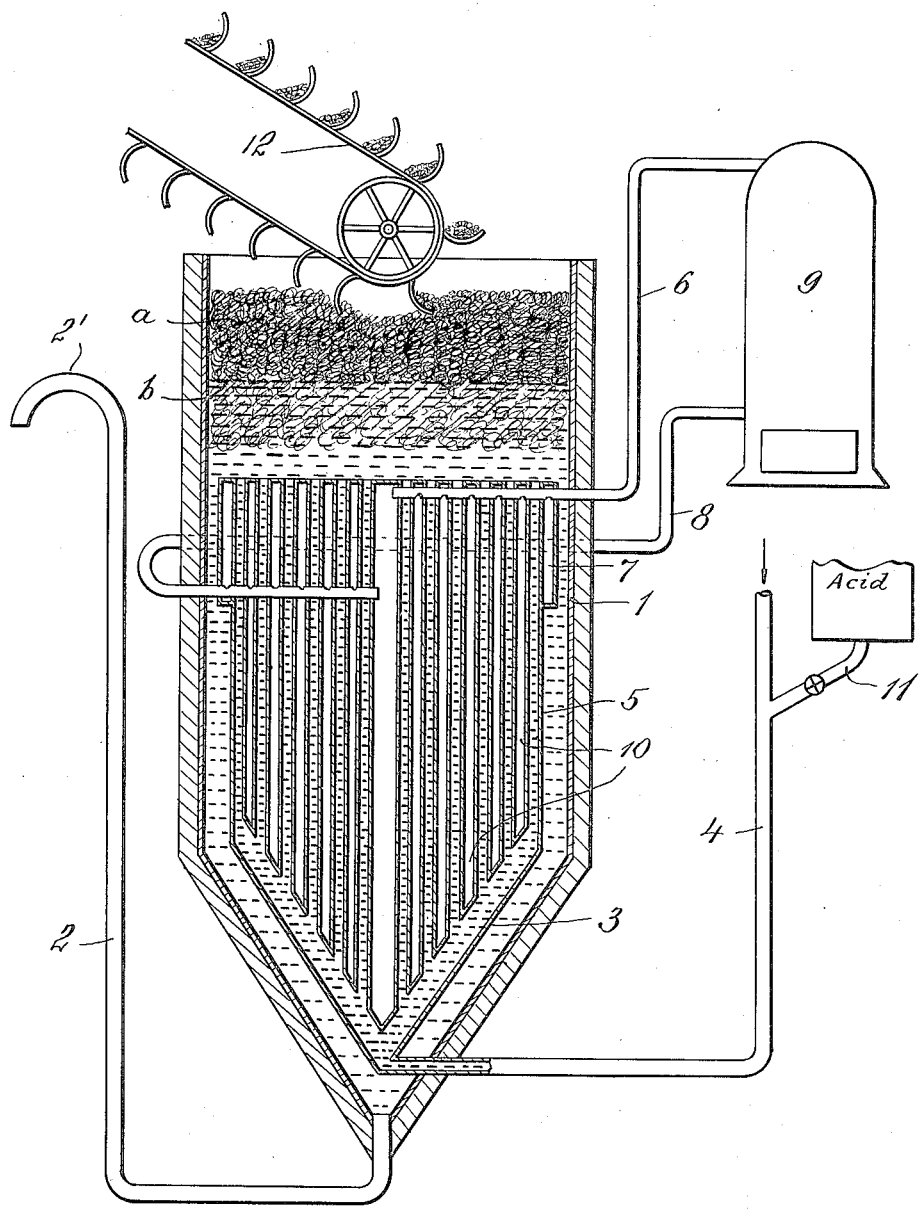

1,430,182

UNITED STATES PATENT OFFICE.

CHARLES LEE PECK, OF NEW YORK, N. Y., ASSIGNOR TO THE DORR COMPANY, A CORPORATION OF DELAWARE.

DEHYDRATING ACTIVATED SLUDGE.

Application filed March 17, 1921. Serial No. 453,187.

*To all whom it may concern:*

Be it known that I, CHARLES LEE PECK, a citizen of the United States, residing at New York city, in the county of New York, State of New York, have invented certain new and useful Improvements in Dehydrating Activated Sludge; and I do hereby declare the following to be a full, clear, and exact description of the invention, such as will enable others skilled in the art to which it appertains to make and use the same.

The present invention relates to the treatment of activated sludge, and more particularly to the dehydrating or dewatering of activated sludge. The invention has for its object the provision of an improved method of and apparatus for dehydrating activated sludge.

In the activated sludge process of treating sewage, the sewage is subjected to aeration in the presence of aerodic bacteria. After the completion of the aeration treatment, the solid matter in the sewage has been converted by biological action into a gelatinous mass consisting for the most part of biological growths. The so-treated sewage is then usually transferred to settling tanks or basins wherein the gelatinous solid matter settles and may be withdrawn from the tanks or basins as a sludge which is known in the art as activated sludge.

Activated sludge consists for the most part of biological growths of a slimy gelatinous character. As a rule, such sludge, after settling in the manner just described, will contain 98 to 99% of water. It is, of course, possible to obtain by sedimentation an activated sludge containing a lower percentage of water and under extremely favorable conditions it is possible to reduce by settling or sedimentation the water content of activated sludge to as low as 95%. However, I have found in actual practice that it is not economical or even practical to attempt to dehydrate activated sludge by settling alone to a water content much below 98%, and in the work which I have conducted in disposing of activated sludge, the activated sludge after settling contains generally about 98.5% of water.

The dehydration or dewatering of activated sludge containing around 98% of water, or indeed as little as 90% of water, is a problem of very considerable difficulty in actual commercial practice. In fact, prior to the present invention, the activated sludge process of sewage treatment has not come into general use because of the difficulties encountered in the disposal of the sludge, which difficulties are due almost entirely to the lack of any satisfactory method for economically dewatering the activated sludge. The particular need in the art has been an economical and satisfactory method for reducing the water content of activated sludge to about 80 to 85%. Sludge containing 85% or less of water can be satisfactorily and economically dewatered to the desired extent in various ways, but prior to my present invention no practical method has existed, as far as I am unaware, for reducing the water content of activated sludge to 85% or less.

The present invention contemplates an improved method of dehydrating or dewatering activated sludge with the view of obtaining in a practical and economical manner a product containing about 85% or less of water. In reality, this represents the removal of a tremendous amount of water from the sludge, since if we start with fifty tons of activated sludge containing $98\frac{1}{2}\%$ of water and obtain a product containing 85% of water, we have removed forty-five tons of water from the original fifty tons of activated sludge.

In its broad aspect, the present invention contemplates the treatment of activated sludge with an appropriate agent under conditions resulting in the evolution of gas within the sludge. This evolution of gas causes levitation of the solid matter, and as a result of this action the solid matter rises to the surface of the sludge undergoing treatment and can be removed by appropriate means. In order to dehydrate the levitated solid matter to the greatest possible extent, I prefer to permit such solid matter to accumulate and form a floating mass of which a considerable part is above the liquor level of the sludge, and to remove from this floating mass only solid matter which has been maintained for an appropriate period of time above the liquor level of the sludge and has thereby been permitted to drain to a desired extent. The floated or levitated solid matter has a fibrous nature which permits it to drain readily. By thus progressively causing the levitated solid matter to rise above and float on the liquor level of the sludge and permitting it to remain for an appropriate period of time above the liquor level of the sludge a very beneficial draining takes place.

I have found that the desired gas evolution within the activated sludge can be brought about by acidifying the sludge in the presence of a substance decomposable by acid with gas evolution. The activated sludge usually contains carbonates or similar salts which react with acid, for example, sulfuric acid, with an evolution of gas. In case the sludge does not naturally contain carbonates or equivalent salts, it is necessary, in carrying out the present invention, to add to the sludge an appropriate substance of this nature, such as lime-rock, soda ash, or the like.

I have found sulfuric acid admirably adapted for carrying out the invention. Sulfuric acid not only reacts with the activated sludge to produce the desired gas evolution but also exercises a coagulating effect upon the solid matter in the sludge. By "coagulating effect" I mean the contraction of the solid particles due to changes in the colloidal properties of the particles with variations in the hydrogen ion concentration. From my investigations, I have found that the maximum contraction takes place at a hydrogen ion concentration equivalent to between 2 to 3 parts per million of acid in excess of neutrality to methyl orange indicator, and I have also found that this hydrogen ion concentration is favorable to the levitation or flotation of the solid matter in the sludge as contemplated by the present invention. The most desirable hydrogen ion concentration will, of course, vary within small limits in the case of various sludges, but the foregoing figures indicate generally the order of magnitude of the hydrogen ion concentration which I have found most favorable in actual practice.

I find it usually desirable to promote the evolution of gas within the sludge by heating the sludge after the addition thereto of the gas evolving agent. Thus, in accordance with my preferred practice, I first acidify the sludge in the presence of a substance decomposable by acid with the evolution of gas, and then heat the acidified sludge to a sufficiently high temperature to promote to the desired extent the evolution of gas. For this purpose, I have found that the sludge should be heated to a temperature above 30° C., and I now believe that the optimum results are attained by heating the sludge, after acidification, to a temperature of from 50 to 80° C.

As a result of my investigations, I have determined that the sequence in which the acidification and heating of the sludge takes place is of particular importance, and that it is necessary to first acidify the sludge and then heat the acidified sludge to the desired temperature if optimum results are to be attained. Where the sludge is first heated and subsequently acidified the losses in the ammonia content of the sludge are excessive. Accordingly, in order to conserve the ammonia in the sludge, it is essential, where heat is employed, to promote the evolution of gas, that such heating take place after the sludge has been treated with the gas-evolving agent. The loss of ammonia resulting from heating activated sludge is greatest when the sludge is alkaline. For this reason, when the sludge is to be heated, it is desirable to reduce the alkalinity of the sludge. This reduction in the alkalinity of the sludge is effected, in accordance with the present invention, by acidifying the sludge, as hereinbefore described, until it is slightly acid to methyl orange indicator.

In the accompanying drawings, the single figure diagrammatically represents in sectional elevation an improved construction of apparatus particularly adapted for the practice of the present invention.

Referring now to the accompanying drawings, there is represented a cylindrical receptacle or tank 1 having a conically shaped bottom. A liquor discharge conduit 2 communicates with the bottom of the tank, and may advantageously be arranged to effect the withdrawal of liquor from the tank in a substantially continuous manner by siphon action, the rate of discharge or withdrawal of the liquor from the tank being appropriately controlled by adjustment of the height of the bend 2' of the discharge conduit.

Within the tank 1 is mounted a device for heating the sludge after it has been acidified and prior to its introduction into the tank. This heating device comprises a conical header 3 communicating at its bottom with a sludge supply pipe 4 and connected at its enlarged upper end with a cylindrical drum 5. A closed heating chamber 7 is operatively mounted above the cylindrical drum 5, and is adapted to be supplied with an appropriate heating medium by a pipe 6. The heating medium is exhausted from the chamber 7 through a pipe 8 and is returned to a furnace 9 where it is again heated to the desired temperature. A series of heat transfer tubes 10 communicate with the closed heating chamber 7 and depend into the drum 5 and header 3. It will, of course, be understood that the incoming sludge passes around the transfer tubes 10 and through the heating chamber 7 and is introduced into the tank 1 at a point somewhat above the center of the tank.

Acid is conveniently added to the sludge supply pipe 4 by means of an acid supply pipe 11. The thus acidified sludge passes through the header 3, cylindrical drum 5 and heating chamber 7 and is heated to the desired temperature prior to its introduction into the tank 1. As a result of the combined action of the acid and heat, solid matter in the sludge is caused to rise towards the surface thereof and is permitted to accumulate and form a floating mass of which a considerable part is above the liqour level of the sludge. Thus, as diagrammatically represented in the accompanying drawing about one-half of the floating mass (a) of levitated solid matter is above the liquor level (b) of the sludge in the tank 1. In this manner, the floating solids raise the previously floated solids out of the liquor and thereby permit a large amount of moisture to drain therefrom. In practice, I permit the levitated solid matter to accumulate to a depth of several feet, of which approximately one-half is above the liquor level.

The solid matter raised to the surface of the sludge in the tank 1 is preferably removed in a substantially continuous manner. Thus, in the drawing, a clam shell conveyor 12 is provided for removing to the desired extent an appropriate portion of the top portion of the floating mass a. The conveyor 12 is operated in such a way that it only removes solid matter which has been raised a considerable distance above the liquor level and has accordingly drained to a desired extent.

I find that the water content of sludge containing 98 to 99% of water can ɔ readily reduced to 90 to 92% of water by the levitation or flotation treatment hereinbefore described without draining of the levitated or floated solid matter. When the floated or levitated solid matter is drained in accordance with the foregoing description, the water content of the sludge can be reduced to around 85%.

I find that the levitation of the solid matter in the sludge is promoted by maintaining the sludge undergoing treatment in a relatively quiescent condition. For this reason, I find it advantageous in carrying out the invention to avoid agitation of the sludge and to conduct the steps of supplying fresh sludge to the treatment tank and of removing the levitated solid matter and withdrawing the resultant liquor in such a manner as to avoid as far as possible any agitation of the sludge undergoing treatment. In this connection, a violent evolution of gas should be avoided because of the agitating effect it has upon the sludge.

The amount of acid required in carrying out the present invention depends upon the carbonate content of the sludge. Titration of a hot sample of sludge to slight acidity to methyl orange indicator establishes the required amount. Ten per cent sulfuric acid is a convenient strength of acid to employ.

As stated before, if the acid is too strong, or if the temperature is too high, the violent evolution of gas will break up the floating mass. The quantity of acid required will, of course, vary for different sludges. A slight excess, detected by methyl orange indicator over the amount required to neutralize the hot sludge, has been found most suitable. For sludges low in carbonates, the addition of powdered lime-rock, or other substance, will be necessary. I have found that the best operating temperature is around 55 to 65° C. The lowest temperature at which complete reaction of the acid with the carbonates will occur is advisable because the cooler the floating mass or cake the higher is its viscosity.

I claim:

1. The method of dehydrating activated sludge which comprises acidifying the sludge under conditions resulting in gas evolution until it is slightly acid to methyl orange indicator and thereby causing levitation of solid matter in the sludge, permitting the levitated solid matter to accumulate and form a floating mass of which a considerable part is above the liquor level of the sludge, and withdrawing solid matter to the desired extent from that portion of the floating mass which is above the liquor level of the sludge.

2. The method of dehydrating activated sludge which comprises treating the sludge with an acid under conditions resulting in the evolution of gas within the sludge and thereby causing levitation of solid matter in the sludge, permitting the levitated solid matter to accumulate and form a floating mass of which a considerable part is above the liquor level of the sludge, and removing from said floating mass only solid matter which has been maintained for an appropriate period of time above the liquor level of the sludge and has thereby been permitted to drain to a desired extent.

3. The method of dehydrating activated sludge which comprises treating the sludge with an acid under conditions adapted to produce an evolution of gas, then heating the sludge to a temperature above 30° C. and thereby promoting the evolution of gas within the sludge and causing levitation of solid matter in the sludge, and removing the levitated solid matter while it is raised above the liquor level of the sludge.

4. The method of dehydrating activated sludge which comprises treating the sludge with an appropriate agent under conditions resulting in the evolution of gas within the sludge and thereby causing levitation of solid matter in the sludge, and removing the levitated solid matter after it has been raised and maintained above the liquor level of the sludge for a sufficient length of time to permit it to drain to a desired extent.

5. The method of dehydrating activated sludge which comprises treating the sludge with an appropriate agent under conditions resulting in a relatively quiescent evolution of gas within the sludge and thereby causing solid matter to rise to and float on the surface of the sludge, and removing the solid matter floating on the surface of the sludge.

6. The method of dehydrating activated sludge which comprises treating the sludge with an acid under conditions resulting in a relatively quiescent evolution of gas within the sludge and thereby causing solid matter to rise to and float on the surface of the sludge, and removing such floating solid matter from the surface of the sludge.

7. The method of dehydrating activated sludge which comprises treating the sludge with an acid under conditions adapted to produce an evolution of gas, then heating the sludge to a temperature above 30° C. and thereby promoting the evolution of gas within the sludge and causing solid matter to rise to and float on the surface of the sludge, and removing such floating solid matter from the surface of the sludge.

8. The method of dehydrating activated sludge which comprises treating a continuous supply of the sludge with an appropriate reagent under conditions resulting in the evolution of gas within the sludge and thereby causing solid matter to rise to and float on the surface of the sludge, removing such floating solid matter form the surface of the sludge in a substantially continuous manner, and withdrawing liquor in a substantially continuous manner from the body of sludge undergoing treatment.

9. The method of dehydrating activated sludge which comprises treating a continuous supply of the sludge with an acid under conditions adapted to produce an evolution of gas, heating the sludge to a temperature above 30° C. and thereby promoting the evolution of gas within the sludge and causing solid matter to rise to and float on the surface of the sludge, removing such floating solid matter from the surface of the sludge in a substantially continuous manner, and withdrawing liquor in a substantially continuous manner from the body of sludge undergoing treatment.

10. The method of dehydrating activated sludge which comprises acidifying the sludge under conditions resulting in gas evolution until it is slightly acid to methyl orange indicator and thereby causing solid matter to rise to and float on the surface of the sludge, and removing such floating solid matter from the surface of the sludge.

11. The method of dehydrating activated sludge which comprises acidifying a continuous supply of the sludge under conditions resulting in gas evolution until it is slightly acid to methyl orange indicator and thereby causing solid matter to rise to and float on the surface of the sludge, removing such floating solid matter from the surface of the sludge in a substantially continuous manner, and with drawing liquor in a substantially continuous manner from the body of sludge undergoing treatment.

12. The method of dehydrating activated sludge which comprises acidifying the sludge until it is slightly acid to methyl orange indicator under conditions adapted to produce an evolution of gas, then heating the sludge to a temperature above 30° C. and thereby promoting the evolution of gas within the sludge and causing solid matter to rise to and float on the surface of the sludge, and removing such floating solid matter from the surface of the sludge.

13. The method of dehydrating activated sludge which comprises acidifying a continuous supply of the sludge until it is slightly acid to methyl orange indicator under conditions adapted to produce an evolution of gas, then heating the sludge to a temperature above 30° C. and thereby promoting the evolution of gas within the sludge and causing solid matter to rise to and float on the surface of the sludge, removing such floating solid matter in a substantially continuous manner from the surface of the sludge, and withdrawing liquor in a substantially continuous manner from the body of sludge undergoing treatment.

14. The method of dehydrating activated sludge which comprises acidifying the sludge until it is slightly acid to methyl orange indicator under conditions adapted to produce an evolution of gas, heating the sludge to a temperature above 30° C. and thereby promoting the evolution of gas within the sludge and causing levitation of solid matter in the sludge, and removing the levitated solid matter after it has been raised and maintained above the liquor level of the sludge for a sufficient length of time to permit it to drain to a desired extent.

15. The method of dehydrating activated sludge which comprises acidifying a continuous supply of the sludge until it is slightly acid to methyl orange indicator under conditions adapted to produce an evolution of gas, heating the sludge to a temperature above 30° C. and thereby promoting the evolution of gas within the sludge and causing levitation of solid matter in the sludge, and removing in a substantially continuous manner the levitated solid matter after it has been raised and maintained above the liquor level of the sludge for a sufficient length of time to permit it to drain to a desired extent.

16. The method of dehydrating activated sludge which comprises treating the sludge with an acid in the presence of a substance decomposable by the acid with gas evolution, then heating the sludge and thereby promoting the evolution of gas within the sludge and causing levitation of solid matter in the sludge, progressively causing the levitated solid matter to rise above and float on the liquor level of the sludge, and removing solid matter to the desired extent from the top surface of the floating mass.

17. The method of dehydrating activated sludge which comprises acidifying the sludge in the presence of a substance decomposable by acid with gas evolution, then heating the sludge and thereby promoting the evolution of gas within the sludge and causing levitation of solid matter in the sludge, permitting the levitated solid matter to accumulate and form a floating mass of which a considerable part is above the liquor level of the sludge, and removing from said floating mass only solid matter which has been maintained for an appropriate period of time above the liquor level of the sludge and has thereby been permitted to drain to a desired extent.

18. The method of dehydrating activated sludge which comprises treating the sludge with an acid in the presence of a substance decomposable by the acid with gas evolution, then heating the sludge to a temperature of from 50 to 80° C. and thereby promoting the evolution of gas within the sludge and causing solid matter to rise to and float on the surface of the sludge, and removing such floating solid matter from the surface of the sludge.

19. The method of dehydrating activated sludge which comprises treating the sludge with an acid in the presence of a substance decomposable by the acid with gas evolution, then heating the sludge and thereby promoting the evolution of gas within the sludge and causing levitation of solid matter in the sludge, permitting the levitated solid matter to accumulate and form a floating mass of which a considerable part is above the liquor level of the sludge, and removing from said floating mass only solid matter which has been maintained for an appropriate period of time above the liquor level of the sludge and has thereby been permitted to drain to a desired extent.

20. The method of dehydrating activated sludge which comprises treating a continuous supply of the sludge with an acid in the presence of a substance decomposable by the acid with gas evolution, then heating the sludge to a temperature of from 50 to 80° C. and thereby promoting the evolution of gas within the sludge and causing solid matter to rise to and float on the surface of the sludge, removing such floating solid matter in a substantially continuous manner from the surface of the sludge, and withdrawing liquor in a substantially continuous manner from the body of sludge undergoing treatment.

21. The method of dehydrating activated sludge which comprises treating a continuous supply of the sludge with an acid in the presence of a substance decomposable by acid with gas evolution, then heating the sludge to a temperature of from 50 to 80° C. and thereby promoting the evolution of gas within the sludge and causing levitation of solid matter in the sludge, and removing in a substantially continuous manner the levitated solid matter after it has been raised and maintained above the liquor level of the sludge for a sufficient length of time to permit it to drain to a desired extent.

22. The method of dehydrating activated sludge which comprises acidifying the sludge under conditions adapted to produce an evolution of gas, then heating the sludge to a temperature of from 50 to 80° C. and thereby promoting the evolution of gas within the sludge and causing levitation of solid matter in the sludge, and removing the levitated solid matter while it is raised above the liquor level of the sludge.

23. The method of dehydrating activated sludge which comprises subjecting the sludge to treatment with an agent which reacts with the sludge to produce an evolution of gas and also exerts a coagulating effect upon the solid matter of the sludge, maintaining the sludge during such treatment in a relatively quiescent condition so as to permit levitation of the solid matter therein, and removing the levitated solid matter from above the liquor level of the sludge.

24. The method of dehydrating activated sludge which comprises treating the sludge with an appropriate agent under conditions resulting in the evolution of gas within the sludge, maintaining the sludge during such treatment in a relatively quiescent condition so as to permit levitation of the solid matter therein and removing the levitated solid matter from the top surface of the sludge undergoing treatment.

25. The method of dehydrating activated sludge which comprises acidifying the sludge under conditions resulting in gas evolution and thereby causing levitation of solid matter in the sludge, maintaining the sludge during such treatment in a relatively quiescent condition so as to promote the levitation of solid matter, and removing the levitated solid matter from the top surface of the sludge undergoing treatment.

26. The method of dehydrating activated sludge which comprises acidifying the sludge under conditions adapted to produce an evolution of gas, then heating the sludge to a temperature above 30° C. and thereby promoting the evolution of gas within the sludge and causing levitation of solid matter in the sludge, maintaining the sludge during such treatment in a relatively quiescent condition so as to promote levitation of the solid matter, and removing the levitated solid matter from the top surface of the sludge undergoing treatment.

27. The method of dehydrating activated sludge which comprises treating the sludge with an acid in the presence of a substance decomposable by the acid with gas evolution, then heating the sludge and thereby promoting the evolution of gas within the sludge and causing levitation of solid matter in the sludge, maintaining the sludge during such treatment in a relatively quiescent condition so as to permit levitation of the solid matter, and removing the elevated solid matter from the top surface of the sludge undergoing treatment.

28. The method of dehydrating activated sludge which comprises acidifying the sludge under conditions adapted to produce an evolution of gas, then heating the sludge to a temperature of from 50 to 80° C. and thereby promoting the evolution of gas within the sludge and causing levitation of solid matter in the sludge, maintaining the sludge during such treatment in a relatively quiescent condition so as to promote levitation of the solid matter therein, and removing the levitated solid matter from the top surface of the sludge undergoing treatment.

29. The method of dehydrating activated sludge which comprises acidifying the sludge under conditions resulting in gas evolution and thereby causing levitation of solid matter in the sludge, removing the levitated solid matter after it has been raised and maintained above the liquor level of the sludge for a sufficient length of time to permit it to drain to a desired extent, and maintaining the sludge during such treatment in a relatively quiescent condition so as to promote levitation of the solid matter.

30. The method of dehydrating activated sludge which comprises acidifying the sludge under conditions adapted to produce an evolution of gas, then heating the sludge and thereby promoting the evolution of gas within the sludge and causing levitation of solid matter within the sludge, removing the levitated solid matter after it has been raised and maintained above the liquor level of the sludge for a sufficient length of time to permit it to drain to a desired extent, and maintaining the sludge during such treatment in a relatively quiescent condition so as to promote levitation of the solid matter.

31. The method of dehydrating activated sludge which comprises acidifying the sludge until it is slightly acid to methyl orange indicator under conditions adapted to produce an evolution of gas, then heating the sludge to a temperature of from 50 to 80° C. and thereby promoting the evolution of gas within the sludge and causing levitation of solid matter in the sludge, removing the levitated solid matter after it has been raised and maintained above the liquor level of the sludge for a sufficient length of time to permit it to drain to a desired extent, and maintaining the sludge during such treatment in a relatively quiescent condition so as to promote levitation of the solid matter therein.

32. The method of dehydrating activated sludge which comprises acidifying a continuous supply of the sludge under conditions adapted to produce an evolution of gas, then heating the sludge and thereby promoting the evolution of gas within the sludge and causing levitation of solid matter in the sludge, removing in a substantially continuous manner the levitated solid matter after it has been raised and maintained above the liquor level of the sludge for a sufficient length of time to permit it to drain to a desired extent, and maintaining the sludge during such treatment in a relatively quiescent condition so as to promote levitation of the solid matter therein.

33. An apparatus for dehydrating activated sludge comprising a receptacle, a sludge heater mounted within said receptacle and arranged to discharge the sludge after heating into said receptacle, means for acidifying the sludge, means for supplying the acidified sludge to said sludge heater, means for removing solid matter from near the top of said receptacle, and means for withdrawing liquor from near the bottom of said receptacle.

34. An apparatus for dehydrating activated sludge comprising a receptacle, a heating device mounted within said receptacle and arranged to discharge sludge into the receptacle and to heat the sludge during its passage through the heating device, means for acidifying the sludge, means for supplying the acidified sludge to said heating device, means for removing solid matter from near the top of said receptacle, and means for withdrawing liquor from near the bottom of said receptacle.

35. An apparatus for dehydrating activated sludge comprising a receptacle, a sludge heater mounted within said receptacle and having means for the circulation of an appropriate heating medium and means in heat transfer relation therewith for conducting sludge into the receptacle, means for acidifying the sludge, means for supplying the acidified sludge to said sludge heater, means for removing solid matter from near the top of said receptacle, and means for withdrawing liquor from near the bottom of said receptacle.

In testimony whereof I affix my signature.

CHARLES LEE PECK.